United States Patent [19]

Sbrocca

[11] 4,115,167

[45] Sep. 19, 1978

[54] CASTABLE BINDER FOR CAST PLASTIC-BONDED EXPLOSIVES

[75] Inventor: Dino A. Sbrocca, China Lake, Calif.

[73] Assignee: The United States of America as represented by the Secretary of the Navy, Washington, D.C.

[21] Appl. No.: 522,674

[22] Filed: Nov. 11, 1974

[51] Int. Cl.² ............................................. C06B 45/10
[52] U.S. Cl. .................................. 149/19.5; 149/20; 149/92
[58] Field of Search ........................... 149/195, 92, 20

[56] References Cited

U.S. PATENT DOCUMENTS

| 2,845,025 | 7/1958 | Stark | 149/92 X |
|---|---|---|---|
| 2,965,466 | 12/1960 | Ball | 149/92 X |
| 3,000,714 | 9/1961 | Batchelder et al. | 149/19.5 |
| 3,009,386 | 11/1961 | Billard | 149/92 X |
| 3,391,036 | 7/1968 | Bryant et al. | 149/19.5 |
| 3,629,019 | 12/1971 | Lawrence | 149/19.5 |
| 3,653,994 | 4/1972 | Batchelder et al. | 149/19.5 |

*Primary Examiner*—Edward A. Miller
*Attorney, Agent, or Firm*—R. S. Sciascia; Roy Miller; L. E. K. Pohl

[57] ABSTRACT

A castable binder for plastic bonded explosives is disclosed. The binder is made up of 42 parts by weight of one unsaturated polyester resin, 30 parts by weight of another unsaturated polyester resin and 28 parts by weight of styrene.

3 Claims, No Drawings

CASTABLE BINDER FOR CAST PLASTIC-BONDED EXPLOSIVES

BACKGROUND OF THE INVENTION

1. Field of the Invention.

This invention relates to castable binders for use in the manufacture of plastic bonded explosives.

2. Description of the Prior Art.

Laminac polyester resins, which are made and sold by the American Cyanamid Company, are well known and are widely used for many purposes. One purpose for which they have been used is in the manufacture of plastic pyrotechnic compounds. U.S. Pat. No. 2,984,558 discloses pyrotechnic compounds utilizing, among other ingredients, Laminac resin 4128 and Laminac resin 4134. In U.S. Pat. No. 2,984,558, the use of benzyl alcohol to stabilize the product against brittleness is disclosed and magnesium and a perchlorate (potassium or ammonium) are incorporated to manufacture illuminant flares.

In efforts to provide a castable binder for explosive compositions, the inventor experimented with various compositions which were similar to those disclosed in U.S. Pat. No. 2,984,558 in that Laminac resins 4128 and 4134 were used. The compositions experimented with by the inventor differed from those of U.S. Pat. No. 2,984,558 in that styrene replaced the benzyl alcohol. These compositions all failed to pass brittleness tests.

Other experiments showed that neither Laminac 4134 nor Laminac 4128 could be used, with styrene, to produce castable binders for explosives. If either of these resins is used alone with styrene difficulties arise in the curing process and resiliance is not satisfactory.

SUMMARY OF THE INVENTION

It has now been unexpectedly found that a composition made up by mixing 42 parts by weight Laminac 4116, 30 parts by weight Laminac 4134 and 28 parts by weight styrene monomer forms an excellent, non-brittle plastic binder for explosives when cured.

DESCRIPTION OF THE PREFERRED EMBODIMENT

Laminac 4134 is an unsaturated polyester resin having styrene as a reactive monomer and is of the flexible type based upon diethylene glycol, maleic anhydride and adipic acid.

Laminac 4116 is an unsaturated polyester resin having styrene as a reactive monomer and is derived from propylene glycol, maleic anhydride and phthalic anhydride, the ratio of maleic anhydride to phthalic anhydride being relatively low.

To fabricate a plastic bonded explosive according to this invention, one follows the following steps: First, a mixing kettle is charged with dry or styrene wet explosive filler. If dry, styrene is then added to the kettle. Then a premixed batch of Laminac 4134 and Laminac 4116 is added to the mixing kettle. Then cobalt naphthenate is added to the mixing kettle and the resulting mass is thoroughly stirred. The methyl ethyl ketone peroxide is added and the resulting mass is again stirred. The mass is then cast into a suitably shaped mold and allowed to cure for from 24 to 48 hours at ambient temperature ~77° F.

The explosives used in the above procedure may be a well known explosive such as HMX, RDX, a HMX and aluminum powder mixture or a RDX and aluminum powder mixture. Any amount of explosive, up to 85 percent by weight, can be used. That is, an explosive composition containing up to 85 weight percent explosive filler and as little as 15 weight percent binder may be prepared with a binder according to this invention. HMX is a letter designation for cyclotetramethylene-tetranitramine. RDX is a letter designation for cyclotrimethylene-trinitramine.

In the above-described process, approximately 0.08 grams of cobalt nephthenate is added for every 100 gm. of binder (styrene + Laminac 4116 + Laminac 4134).

In the above-described process, approximately 0.24 gm. of methyl ethyl ketone peroxide is added for every 100 gm. of binder.

If the mold used in carrying out the above-described process is intricate in shape, it may be desirable to vacuum load the mold.

The weight percentages of styrene, Laminac 4116 and Laminac 4134 in the above-described process are 28, 42 and 30 respectfully. That is, the binder, when considered apart from the explosive filler and other additives (cobalt naphthenate and methyl ethyl ketone peroxide) is made up of 28 parts of weight styrene, 42 parts by weight Laminac 4116 and 30 parts by weight Laminac 4134. These relative amounts have been found to be very important. If more Laminac 4116 is used with a correspondingly lower amount of Laminac 4134, the resulting product becomes brittle. If more Laminac 4134 is used with correspondingly less Laminac 4116 the resulting mass is difficult to cure without achieving an undesirable tacky surface. More styrene with lesser amounts of Laminac 4116 and Laminac 4134 also causes brittleness in the final product. And, less styrene with more of each of the two Laminacs, results in a binder which is too viscous (prior to adding the curatives) to properly wet the explosive.

When the above-specified amounts of styrene, Laminac 4116 and Laminac 4134 are used, no detectable exotherm is produced during curing, the resulting product is stable at temperatures up to 300° F. and the resulting product is completely non-brittle. Tests have shown that the cured binder, containing amounts of ingredients as specified above, can be struck with repeated hammer blows or thrown violently against a wall with no deleterious effects, i.e., cracking.

What is claimed is:

1. In a cast plastic bonded explosive wherein high explosive filler material is bound in a matrix of binder material, the improvement residing in utilizing a mixture of (1) 42 parts by weight of a composition made up of styrene and an unsaturated polyester resin derived from propylene glycol, maleic anhydride and phthalic anhydride wherein the ratio of maleic anhydride to phthalic anhydride is relatively low and (2) 30 parts by weight of a composition made up of styrene and an unsaturated polyester resin based upon diethylene glycol, maleic anhydride and adipic acid to which (3) 28 additional parts of styrene have been added to form a binder material.

2. A cast plastic bonded explosive according to claim 1 wherein up to 85 weight percent of high explosive filler material is present per 15 weight percent of said matrix of binder material.

3. A cast plastic bonded explosive according to claim 2 wherein the high explosive filler material is selected from the group consisting of cyclotetramethylenetetranitramine, cyclotrimethylenetrinitramine, a mixture of cyclotetramethylenetetranitramine and aluminum powder and a mixture of cyclotrimethylenetrinitramine and aluminum powder.

* * * * *